United States Patent
Walls

[19]

[11] Patent Number: 5,969,708
[45] Date of Patent: Oct. 19, 1999

[54] TIME DEPENDENT CURSOR TOOL

[75] Inventor: Alan James Walls, Christchurch, New Zealand

[73] Assignee: Trimble Navigation Limited, Sunnyvale, Calif.

[21] Appl. No.: 08/732,659

[22] Filed: Oct. 15, 1996

[51] Int. Cl.$^6$ .................................................. G09G 5/08
[52] U.S. Cl. ........................ 345/145; 345/157; 345/163
[58] Field of Search .................................. 345/145, 156, 345/157, 160, 161, 163, 173, 179, 168, 169, 212

[56] References Cited

U.S. PATENT DOCUMENTS

| | | | |
|---|---|---|---|
| 5,559,943 | 9/1996 | Cyr et al. .................................. | 345/145 |
| 5,585,821 | 12/1996 | Ishikura et al. ......................... | 345/145 |
| 5,596,347 | 1/1997 | Robertson et al. ...................... | 345/145 |

OTHER PUBLICATIONS

"Automatic Selection with Mouse Pointer" IBM Technical Disclosure Bulletin, vol. 38 No. 10 Oct. 1995, pp. 549–550.

*Primary Examiner*—Dennis-Doon Chow
*Attorney, Agent, or Firm*—Blakely, Sokoloff, Taylor & Zafman LLP

[57] ABSTRACT

A cursor tool is assigned to a cursor and a first cursor control event is performed. If a predetermined time interval expires before a second cursor control event is performed, the cursor tool is activated. The first cursor control event may be a mouse down event and the second cursor control event may be a mouse up event. In another embodiment, a plurality of cursor tools are assigned to a cursor and a sequence of cursor control events are recognized. The sequence may begin with a mouse down event. If one or more mouse move events follow, a determination as to whether these are intended events is made. So long as no tools have previously been selected, if the mouse move events are determined to be intended events, a first of the assigned cursor tools is selected. Alternatively, if the mouse move events are not intended events but the events occurred after a preestablished time limit, a second of the assigned cursor tools is selected. If a mouse up event is then performed, and no cursor tool has yet been selected, a third of the assigned cursor tools is selected and the appropriate cursor tool action is performed. Otherwise, if a cursor tool was selected before the mouse up event, the action associated with the previously selected cursor tool is performed after the mouse up event.

10 Claims, 5 Drawing Sheets

TIME DEPENDENT CURSOR TOOL

RELATED APPLICATIONS

This application is related to U.S. patent application No. 08/637,291, filed Apr. 24, 1996, entitled "Multifunction Cursor Tool" and assigned to the assignee of the present invention.

FIELD OF THE INVENTION

The area of the present invention relates to interactive computer systems having graphical user interfaces and, more particularly, to a user interface having a time dependent cursor tool.

BACKGROUND

A typical interactive computer system incorporates a user interface which bridges the gap between a human user who seeks to control the computer system and the hardware and/or software which makes up the computer system. In addition to hardware components such as alphanumeric keyboards, graphical user interfaces have become increasingly common features of personal computers. Such interfaces are provided either as built-in portions of the computer operating system, as in the case of the Macintosh® computer available from Apple Computer, Inc. of Cupertino, Calif., or as add on software products that can be purchased and installed separately, such as the Windows™ operating system available from Microsoft Corporation of Redmond, Wash.

Regardless of whether the user interface is a hardware device or a software program (or, as is increasingly the case, a combination of both), the purpose of the user interface is, as indicated, to bridge the gap between the human operator and the device being utilized. For example, graphical user interfaces used with personal computers often have the ability to initiate execution of other, so called, application programs. Examples of application programs might be spreadsheets, wordprocessing systems, database programs, etc. Within application programs, a user is often able to move a cursor around an associated workspace displayed on a display screen by using a cursor control device (e.g., a mouse, trackball, pen, etc.). The user triggers certain events by pressing a button on the cursor control device (e.g., "clicking" a mouse). Each cursor control event may be associated with a command or may initiate a feature.

Mouse-driven interfaces often incorporate cursor tools. That is, the cursor can be assigned a specific functionality, after which the cursor is usually displayed as a tool image associated with its functionality. For example, a cursor may be assigned the functionality to act as a zoom-in tool. So assigned, the cursor may be displayed within the work space as a magnifying glass, thus representing its functionality as a zoom-in tool. Typically, each time a user wishes to change the functionality assigned to the cursor, the user must first perform a number of key strokes or other commands. For example, the user may have to access a pull down menu in order to assign a new functionality to the cursor. Thus, using a different cursor function requires two entirely distinct steps, one to select the tool and one to use the tool in the desired way.

For certain application programs, such as computer assisted drawing programs, a user will need to perform a mixture of several related operations repetitively. This will require the user to access a pull down menu or other means of assigning cursor functionality each time she/he wishes to initiate a new event. Such activities soon become a burden and/or a distraction. Therefore, it would be desirable to have a cursor tool which allows the user to select from a number cursor functions easily, and smoothly.

SUMMARY OF THE INVENTION

In one embodiment, a method of operating a computer system is provided. A cursor tool is assigned to a cursor and a first cursor control event is performed. If a predetermined time interval expires before a second cursor control event is performed, the cursor tool is activated. The first cursor control event may be a mouse down event. The second cursor control event may be a mouse up event.

In another embodiment, a plurality of cursor tools are assigned to a cursor and a sequence of cursor control events are recognized. The sequence may begin with a mouse down event. If one or more mouse move events follow, a determination as to whether these are intended events is made. So long as no tools have previously been selected, if the mouse move events are determined to be intended events, a first of the assigned cursor tools is selected. Alternatively, if the mouse move events are not intended events but the events occurred after a preestablished time limit, a second of the assigned cursor tools is selected. If a mouse up event is then performed, and no cursor tool has yet been selected, a third of the assigned cursor tools is selected and the appropriate cursor tool action is performed. Otherwise, if a cursor tool was selected before the mouse up event, the action associated with the previously selected cursor tool is performed after the mouse up event.

BRIEF DESCRIPTION OF THE DRAWINGS

The present invention is illustrated by way of example, and not limitation, in the figures of the accompanying drawings in which similar elements have identical labels and in which.

DETAILED DESCRIPTION

Figure 1:
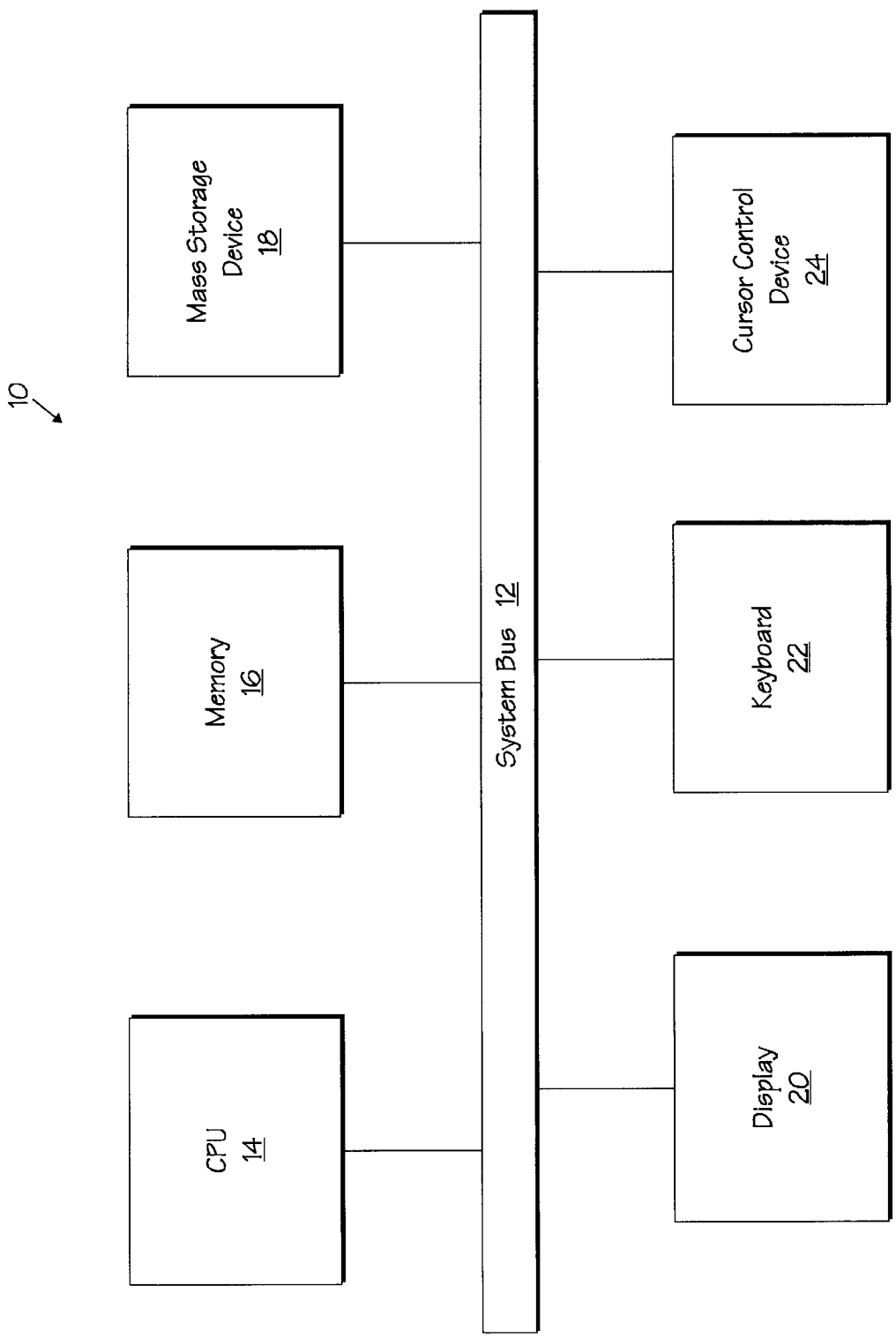
FIG. 1 shows a computer system configured according to one embodiment.

Referring to the drawings in detail wherein like numerals designate like parts and components, the following description sets forth numerous specific details in order to provide a thorough understanding of the present invention. However, after reviewing the specification it will be apparent to those skilled in the art that the present invention may be practiced without these specific details. In other instances, well known structures, programming techniques, and devices have not been described in detail in order not to unnecessarily obscure the present invention.

FIG. 1 illustrates an interactive computer system 10 implementing a graphical user interface and a time dependent cursor tool according to the present invention. Although the user interface and time dependent cursor tool can be used with any number of computer systems, computer system 10 shown in FIG. 1 represents a preferred embodiment of the platform for these elements. As shown in FIG. 1, computer system 10 includes a system bus 12 which functions to couple the other elements of computer system 10 together. Computer system 10 further includes central processing unit (CPU) 14, memory 16, mass storage device 18, display 20, keyboard 22, and cursor control device 24. Those skilled in the art will appreciate that CPU 14 may comprise any one of a number of microprocessors capable of executing computer readable instructions and manipulating data. Computer programs to be executed by CPU 14 will generally be stored in mass storage device 18, which may comprise a read only memory, a flash memory, a hard disk drive, a magnetic tape unit, or other mass storage device. Upon system initialization, computer programs to be executed by CPU 14 will be transferred from mass storage device 18 via system bus 12 and under the control of CPU 14 to memory 16. Those skilled in the art will appreciate that memory 16 may comprise a read/write memory (RAM).

A human operator interacts with and, to some extent, controls the operation of computer system 10 through the use of keyboard 22 and cursor control device 24. keyboard 22 may comprise a standard alphanumeric keyboard, as is well known in the art. Cursor control device 24 may comprise a mouse, trackball, pen or other cursor control device. For some embodiments, cursor control device 24 may be contained within the same housing as keyboard 22. Such an arrangement is commonly found where computer system 10 comprises a notebook computer or a personal digital unit (PDU). Display 20 is used for presenting information to the human operator. As will be further described below, the user interface and time dependent cursor tool image are displayed on display 20 using display techniques well known in the art. Display 20 may comprise a liquid crystal display, a video display, or other well known types of displays.

Figure 2:
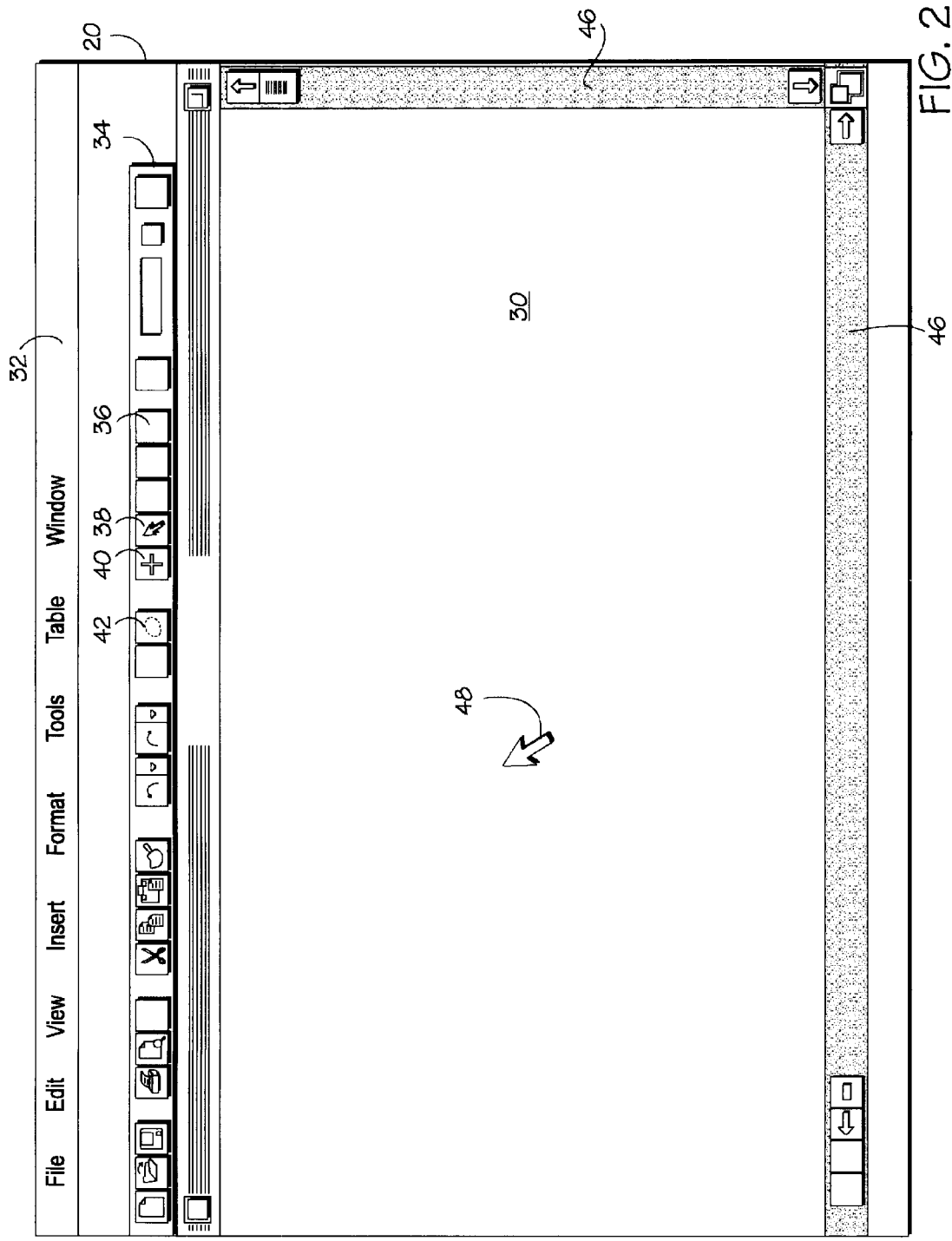
FIG. 2 shows a typical workspace displayed on a display of the computer system shown in FIG. 1.

Referring now to FIG. 2, a "workspace" 30 is displayed on the screen of display 20. Along the top of workspace 30 is displayed menu bar 32. As is familiar to those skilled in the art, various menu commands are displayed within menu bar 32. These menu commands allow a user to control various aspects of computer system 10. Beneath menu bar 32 is displayed tool bar 34. Tool bar 34 includes a number of tool buttons 36. Tool buttons 36 represent various computer commands and cursor tools. Users can implement these commands or functions by positioning cursor 48 over an appropriate tool button 36 and selecting the function represented by the tool button. For one embodiment, tool bar 34 includes tool buttons 38, 40, and 42. Tool button 38 is associated with a single entity selection tool, tool button 40 is associated with a rectangle selection tool and tool button 42 is associated with a region selection tool. The functions of these tools is described further below.

On the right side and bottom of workspace 30 are displayed scroll bars 46. As is familiar to those skilled in the art, scroll bars 46 are used to display various sections of workspace 30. Positioned within workspace 30 is cursor 48. Cursor 48 can be positioned anywhere within workspace 30 using cursor control device 24.

As indicated above, a user can manipulate cursor 48 using cursor control device 24 so as to position cursor 48 over a desired tool button 36. Cursor 48 can then be made to take on the function associated with the desired tool button by selecting the tool button. For the case where cursor control device 24 is a mouse, the selection operation is typically performed by clicking on the tool button. A click operation includes a mouse down event (e.g., pressing down on a mouse button) and a mouse up event (e.g., releasing the mouse button). Alternatively, a user can select a cursor tool by selecting a function from a menu. The menu might be a pull down menu associated with one of the menu commands in menu bar 32 or a menu displayed as the result of a cursor control event (e.g., a right mouse button click).

Some of the typical cursor functions (i.e., cursor tools) which may be available in a computer assisted drawing or other program include a single entity selection function, a rectangle selection function and a region selection function. The single entity selection function allows a user to select a desired entity (e.g., a point, a line segment, a text box, etc.) within workspace 30. Typically, a user initiates the single entity selection function by positioning cursor 48 over tool button 38, the tool button associated with the single entity selection function. The user selects the single entity selection function by clicking on tool button 38 (e.g., for the case where cursor control device 24 is a mouse). After this selection operation, cursor 48 may be displayed as a pointer within workspace 30. The user then performs a single entity selection operation in one of two ways.

First, the user may perform a "quick tap" operation by positioning cursor 48 within workspace 30 and in proximity to an entity of interest. Next, the user performs a click operation by depressing and then immediately releasing the mouse button (i.e., giving the mouse button a quick tap). The result of such an operation is that the closest entity to the cursor 48 is selected and its information (e.g., line fill pattern, arrow head designations, width, pen color, etc.) reported. The term "immediately releasing" used above reflects that fact that the "quick tap" operation must be performed within a predetermined time interval (e.g., the time interval associated with the time between a first click and a second click in a typical double click operation). This time interval may be user selectable.

Second, the user may perform a "query selection" operation which occurs when the user presses and holds down the mouse button. The mouse down action (depressing the mouse button) causes the single entity selection tool to be activated, however, by keeping the mouse button depressed, no one entity is selected. Instead, the user is able to move the cursor 48 within workspace 30 and receive reports of various entities. As the cursor 48 is moved in proximity to an entity, the entity's information is reported, but the entity itself is only temporarily selected. Final entity selection occurs when the mouse button is released. In this way, the user can navigate throughout the various entities within the workspace 30 until a desired entity, as identified by its information, is found. At that point, the user can release the mouse button, completing the entity selection operation, and the entity of interest will be selected.

Another typical tool is a rectangle selection tool. When such functionality has been assigned to cursor 48 (e.g., using tool button 40 or a pull down menu) the cursor image may change, e.g., to a cross. A user initiates a selection operation by positioning cursor 48 within workspace 30 and performing a mouse down event. The mouse down event defines the starting corner of a rectangle. Dragging the mouse then draws a rectangle (preferably using dashed lines) from the starting corner to the current cursor location. Releasing the mouse button (a mouse up event) then selects the entire region (and, hence any entities) within the rectangle. Alternatively, all entities within and touching the rectangle could be selected or, in some embodiments, all entities outside the rectangle could be selected. A similar tool, the region selection tool, operates in substantially the same manner, however, instead of dragging a rectangle, this tool draws a polygon by following the movements of the mouse (i.e., the cursor 48). When the mouse button is released, the polygon is closed (by drawing a line from the starting point to the point of release) and the region (and, hence, the entities) within the polygon is selected.

For some applications, a user may wish to perform a series of single entity, rectangle, single entity, etc. commands in order to examine a number of entities within a workspace 30. For a typical interactive computer system 10, this means that the user must constantly position the cursor 48 over an appropriate tool button 36, then return the cursor pointer to a desired area within workspace 30 and perform the selected operation. Alternatively, the user could select a desired cursor tool using a pull-down menu. Each time the user wishes to change the functionality associated with cursor 48, s/he must perform these operations. Thus, the user is required to continually divert his or her attention from the view shown within workspace 30.

The present invention eliminates the need for the user to constantly redefine the function associated with the cursor by providing a time dependent cursor tool. The time dependent cursor tool may be associated with a predefined set of cursor tools or, in other embodiments, may allow the user to associate desired cursor tools with the cursor. Preferably, the time dependent cursor tool is automatically available when a user selects a rectangle or region selection tool from the toolbar 34. Alternatively, for the embodiment where the tools are independently selectable, the user might keep the shift key of keyboard 22 depressed while clicking on appropriate tool buttons 36 which correspond to the desired functionalities to be assigned to the cursor 48. For example, the single entity selection tool and the rectangle selection tool may be jointly assigned to cursor 48 by separately selecting tool buttons 38 and 40 or appropriate menu options.

When appropriate functions have been assigned to cursor 48, the following actions may govern the selection of individual tools. A mouse down event followed by an immediate release (i.e., a click operation) may activate the single entity selection tool and select the entity closest to the cursor 48 in the manner described above. A mouse down event followed by an immediate drag may activate the rectangle selection tool (or the region selection tool if so assigned to cursor 48) as described above. Finally, a mouse down event followed by a delay for a predetermined time interval (e.g., the time normally used to define a double click operation) may activate the single entity selection tool for use according to the "query selection" mode described above. During the delay period, the mouse should not be moved beyond a preestablished threshold (say, 4 to 8 pixels) in order not to accidentally activate the rectangle selection tool.

A preferred method of implementing the time dependent cursor tool in computer system 10 will now be described. Upon review of this specification, however, those skilled in the art will recognize that other implementations are possible and are within the spirit and scope of the present invention. For example, although the preferred implementation describes the use of the single entity selection tool and the rectangle selection tool, it should be appreciated that other embodiments will allow for other cursor tools to be assigned. Indeed, some embodiments will have three assigned cursor tools as will become apparent. For the preferred implementation, following a mouse down event, if the mouse is moved beyond a preset distance, say eight pixels, within a preset time interval, for example the time specified for a double click action, a drag operation is recognized. Of course, either of these values (the preset distance and/or the preset time interval) could be user selectable. Such a drag operation may cause a first tool (e.g., a rectangle selection tool) to be activated. Note that because the mouse down action itself may cause a slight, unintended movement of the mouse, a buffer distance (in this example, eight pixels) should be provided so that not all mouse movements cause a drag operation to be initiated. If the mouse is not dragged within the preset time interval, a delay operation is recognized. The delay operation may cause a second tool (e.g., a single entity selection tool operating in the "query selection" mode) to be activated. A mouse down event followed by a mouse up event without dragging beyond the preset distance and before the expiration of the preset time interval is recognized as a click operation and may cause a third tool (e.g., a single entity selection tool operating in the "quick tap" mode) to be selected. These operations are described in more detail with reference to FIGS. 3–5.

Figure 3:
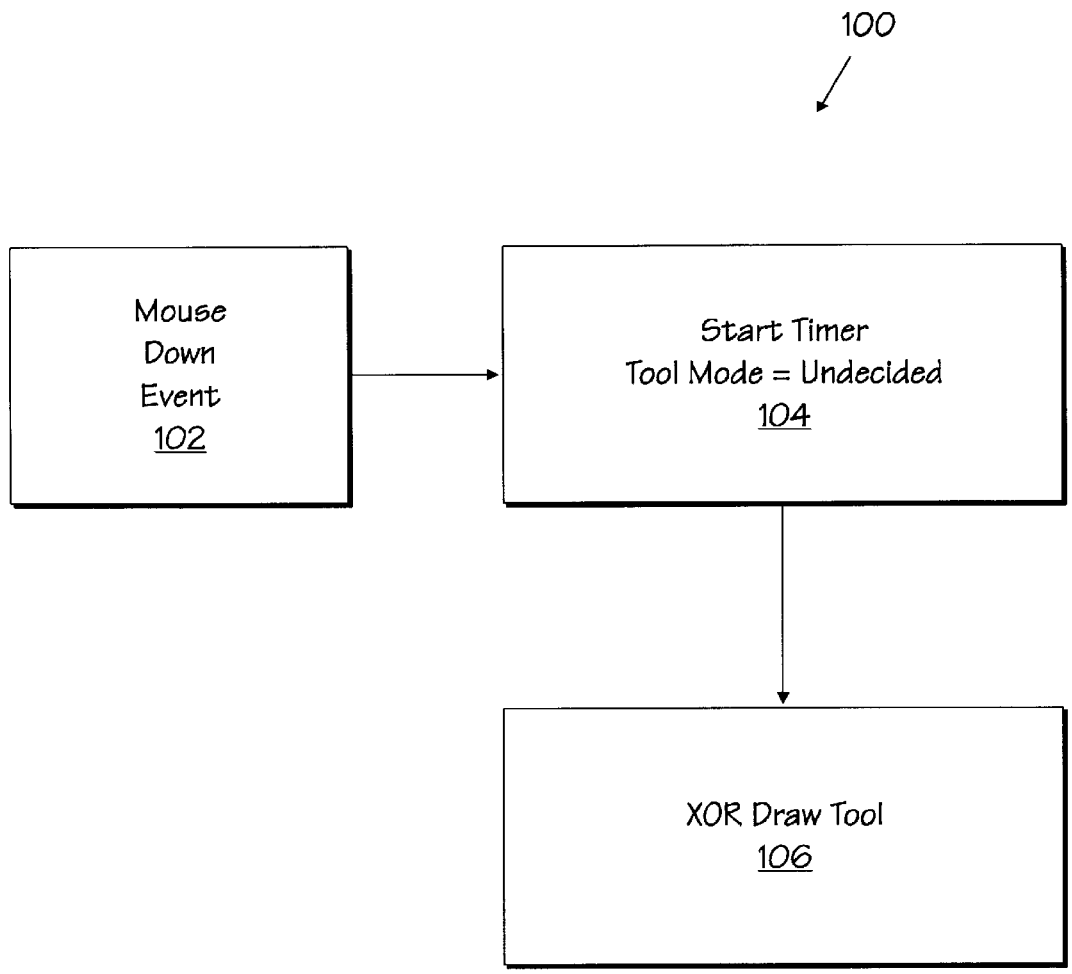
FIG. 3 is a flow diagram illustrating the process of displaying a cursor tool image and assigning a tool mode according to one embodiment.

As shown in FIG. 3, a process 100 for displaying the time dependent cursor tool image begins at step 102 with a mouse down event. Once the mouse down event has been performed, the process moves to step 104 where a timer is started. The timer will be used to determine whether another mouse event is performed within the preset time interval as discussed below. Also at step 104, a tool mode variable is set to "undecided", indicating that until the timer times out (indicating a delay action) or some further mouse event occurs, no current tool mode is selected. At step 106, the cursor tool image is drawn on the display. In one embodiment, the tool image is drawn as a cross, indicating that the tool mode is undecided.

Figure 4:
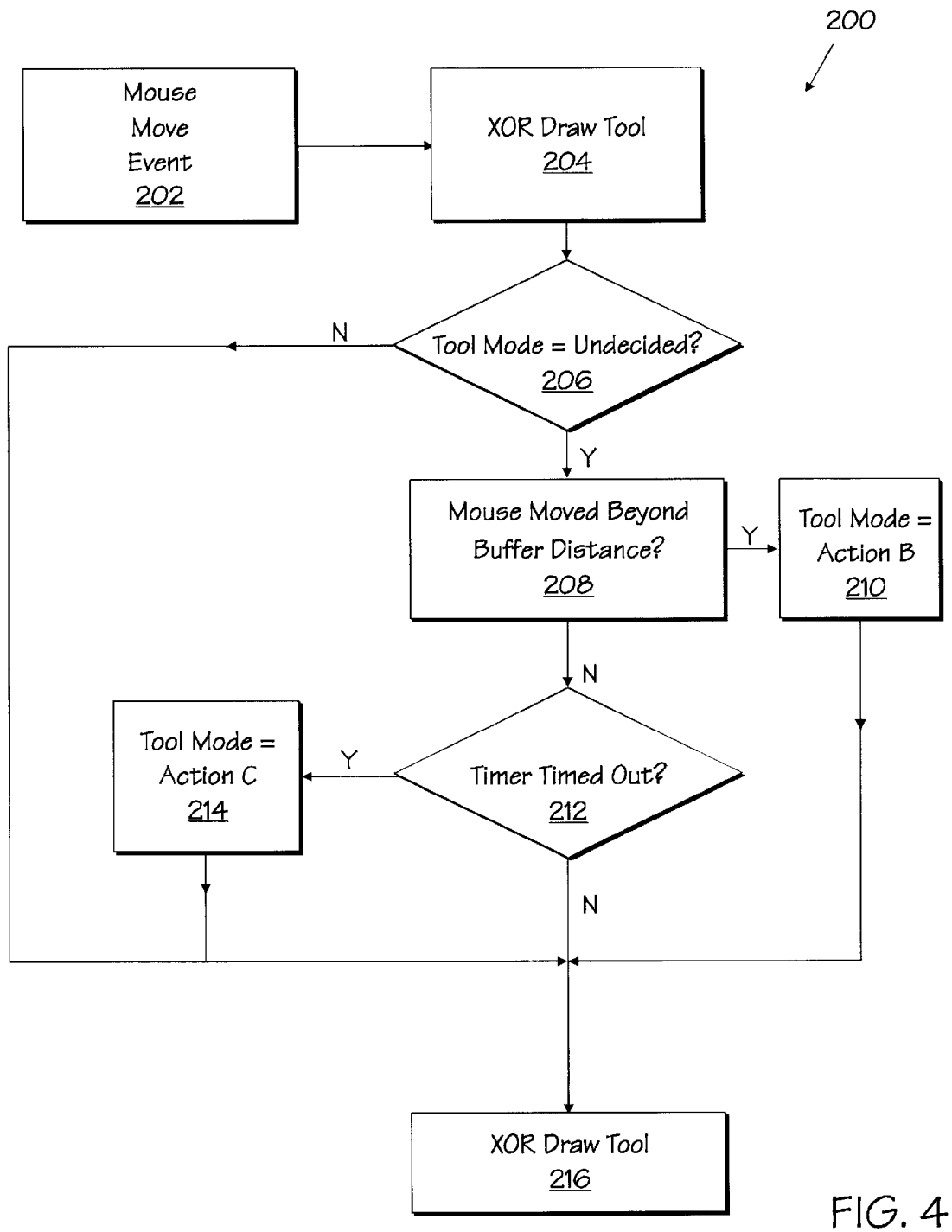
FIG. 4 is a flow diagram illustrating the process of determining a cursor tool mode in response to a mouse down event according to one embodiment.

FIG. 4 shows a process 200 of selecting a cursor tool. The process begins with a mouse move event at step 202. In response to the move event, the process moves to step 204 where the old tool image is eliminated from the screen using an XOR operation as is familiar to those skilled in the art. The XOR operation may be provided by a computer operating system.

Process 200 then moves to step 206 where a decision is made as to whether the tool mode is still undecided. Initially, the tool mode will be undecided (from process 100) so the process will move to step 208 where a determination is made as to whether the mouse has been dragged beyond the buffer distance (e.g., 8 pixels). If the mouse has been moved beyond the buffer distance, indicating that a drag operation is being performed, the process moves to step 210 where the tool mode is set accordingly, e.g., to Action B which corresponds to a rectangle (or region) selection mode.

If, at step 208, it is determined that the mouse has not moved beyond the buffer distance, the process moves to step 212 to determine whether the timer has timed out. If so, the process moves to step 214 and the tool mode is set accordingly, e.g., to Action C which corresponds to a single entity, "query selection" mode. If the timer has not timed out, the tool mode remains set at undecided. Next, the process moves to step 216 and the appropriate tool image is drawn on the display.

Accordingly, process 200 accounts for slight, unintended movements of the mouse which are not intended as drag operations. Process 200 also accounts for the two modes of operation of the single entity selection tool by waiting until the timer times out before activating the single entity selection tool in the "query selection" mode. Note that once a tool mode has been set, further mouse move events (e.g., during a drag operation) will not result in the tool mode being changed.

Figure 5:
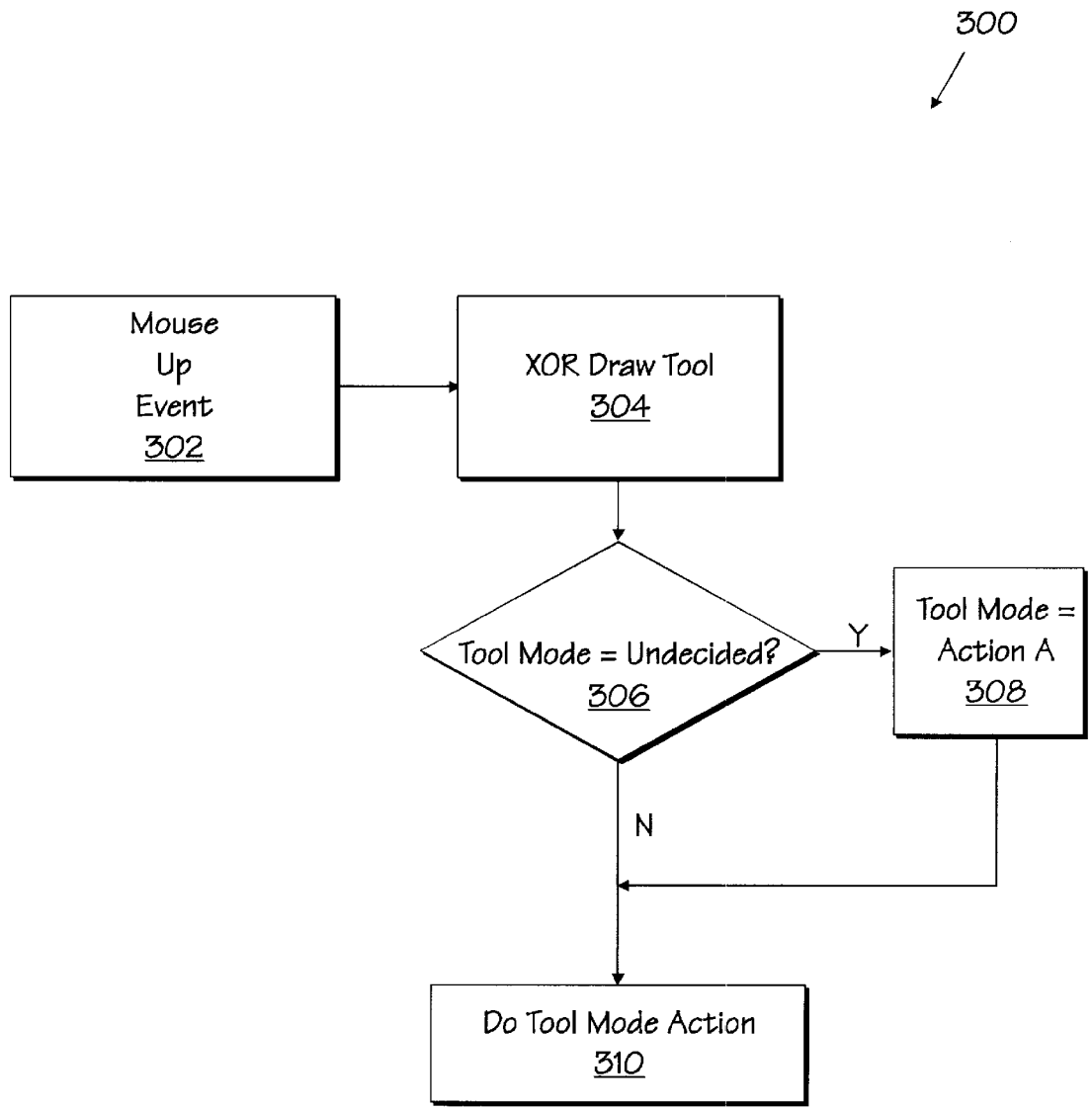
FIG. 5 is a flow diagram illustrating the process of determining a cursor tool action in response to a mouse up event according to one embodiment.

FIG. 5 illustrates process 300 which is performed on a mouse up event (i.e., upon release of the mouse button). The mouse up event occurs at step 302. Then, at step 304 any polygons or rectangles drawn as a result of a region or rectangle selection operation are "undrawn" and the cursor image is reset. The process then moves to step 306 to determine whether the tool mode is undecided. If the tool mode is undecided, the process moves to step 308 where the tool mode is set at Action A, corresponding to a click operation and a single entity selection tool operating in "quick tap" mode. Recognize that if the tool mode is undecided before a mouse up event, this indicates that the timer has not timed out and the mouse has not yet been moved beyond the buffer distance. Hence, the only action which can be performed is a single entity selection in the "quick tap" mode.

Afterwards, or if the tool mode has been previously decided, the process moves to step 310 and an appropriate tool action is performed according to the tool mode. Thus, if the tool mode is set to Action B (corresponding to the rectangle selection tool), all entities within the rectangle described by mouse movements will be selected. If the tool mode is set to Actions A or C (corresponding to a single entity selection tool), the closest entity to the tool image at the time of the mouse up event is selected and reported.

Thus a time dependent cursor tool has been described. In the foregoing specification, the invention has been described with reference to specific exemplary embodiment thereof. It will, however, be evident that various modifications and changes may be made thereto without the parting from the broader spirit and scope of the invention as set forth in the appended claims. For example, although in the above-described example Actions A and C both correspond to a single entity selection tool, it should be appreciated that theses Actions could correspond to different cursor tools. In such a case, a click operation (i.e., Action A) would select a first tool, a mouse down and immediate drag operation would select a second tool, and a mouse down and delay operation would select a third tool. The specification and drawings are, accordingly, to be regarded an illustrative rather than a restrictive sense.

What is claimed is:

1. A method of operating a computer system, comprising:

assigning a plurality of cursor tools to a cursor;

recognizing a mouse down event;

recognizing one or more mouse move events;

determining whether said mouse move events were intended events and, if so, activating a first of said plurality of cursor tools, otherwise determining whether a preestablished time limit has expired and, if so, activating a second of said plurality of cursor tools, otherwise not activating any of said cursor tools.

2. The method of claim 1 further comprising the steps of:

recognizing a mouse up event;

determining whether a cursor tool has been previously activated and, if not, activating a third of said plurality of cursor tools, otherwise performing a cursor tool action corresponding to a previously activated cursor tool.

3. The method of claim 2 wherein said mouse move events are recognized as intended events if said mouse move events comprise a mouse movement of more than a preestablished distance.

4. The method of claim 3 wherein said preestablished time limit is user selectable.

5. The method of claim 4 wherein said preestablished distance is user selectable.

6. A computer readable media storing computer readable instructions which, when executed by a computer, cause the computer to perform the steps of:

assigning a plurality of cursor tools to a cursor;

recognizing a mouse down event;

recognizing one or more mouse move events;

determining whether said mouse move events were intended events and, if so, activating a first of said plurality of cursor tools, otherwise determining whether a preestablished time limit has expired and, if so, activating a second of said plurality of cursor tools, otherwise not activating any of said cursor tools.

7. The computer readable media of claim 6 further storing computer readable instructions which, when executed by the computer, cause the computer to perform the further steps of:

recongizing a mouse up event;

determining whether a cursor tool has been previously activated and, if not, activating a third of said plurality of cursor tools, otherwise performing a cursor tool action corresponding to a previously activated cursor tool.

8. The computer readable media of claim 7 wherein mouse move events are recognized as intended events if said mouse move events comprise a mouse movement of more than a preestablished distance.

9. The computer readable media of claim 8 wherein said preestablished time limit is user selectable.

10. The computer readable media of claim 9 wherein said preestablished distance is user selectable.

* * * * *

UNITED STATES PATENT AND TRADEMARK OFFICE
CERTIFICATE OF CORRECTION

PATENT NO. : 5,969,708
DATED : October 19, 1999
INVENTOR(S) : Alan James Walls

It is certified that error appears in the above-identified patent and that said Letters Patent is hereby corrected as shown below:

In column 3 at line 23 delete "24. keyboard" and insert
--24. Keyboard--

In column 4 at line 59 delete "comer" and insert --corner--

Signed and Sealed this

Thirteenth Day of March, 2001

Attest:

NICHOLAS P. GODICI

Attesting Officer        Acting Director of the United States Patent and Trademark Office